US008081542B1

(12) United States Patent
Grobis et al.

(10) Patent No.: US 8,081,542 B1
(45) Date of Patent: Dec. 20, 2011

(54) THERMALLY-ASSISTED RECORDING (TAR) DISK DRIVE WITH PATTERNED MULTILEVEL MEDIA AND LASER WITH POWER MODULATION

(75) Inventors: Michael Konrad Grobis, San Jose, CA (US); Barry Cushing Stipe, San Jose, CA (US); Dieter K. Weller, San Jose, CA (US); Gabriel Zeltzer, Mountain View, CA (US)

(73) Assignee: Hitachi Global Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/942,206

(22) Filed: Nov. 9, 2010

(51) Int. Cl.
*G11B 7/085* (2006.01)
*G11B 5/02* (2006.01)

(52) U.S. Cl. ............... 369/30.03; 369/13.33; 369/13.24; 360/55; 360/59; 360/131

(58) Field of Classification Search ............... 369/30.03, 369/30.1, 13.33, 13.36, 13.37, 95, 124.03, 369/13.24; 360/59, 55, 131
See application file for complete search history.

(56) References Cited

U.S. PATENT DOCUMENTS

| | | | |
|---|---|---|---|
| 6,865,044 B1 | 3/2005 | Albrecht et al. | |
| 6,882,488 B1* | 4/2005 | Albrecht et al. | 360/55 |
| 6,906,879 B1* | 6/2005 | Albrecht et al. | 360/55 |
| 6,950,260 B2* | 9/2005 | Coffey et al. | 360/59 |
| 7,706,179 B2 | 4/2010 | Khizroev | |
| 2008/0085424 A1 | 4/2008 | Dobin et al. | |
| 2009/0040644 A1 | 2/2009 | Lu et al. | |
| 2009/0080109 A1 | 3/2009 | Fukuzawa et al. | |

FOREIGN PATENT DOCUMENTS

| | | |
|---|---|---|
| JP | 9035344 | 2/1997 |
| JP | 2006059474 | 3/2006 |

OTHER PUBLICATIONS

Ikemoto et al., "Control of Curie Temperature of FePt(Cu) Films Prepared From Pt(Cu)/Fe Bilayers", IEEE Transactions on Magnetics, vol. 44, Issue 11, Nov. 2008, pp. 3543-3546.
Willoughby, "Electronic and magnetic properties of Fe1-xCuxPt", J. Appl. Phys. 95, 6586 (2004).
Thiele et al., "Temperature dependent magnetic properties of highly chemically ordered Fe55-xNixPt45L10 films", J. Appl, Phys. 91, 6595 (2002).
Khizroev et al., "Physics considerations in the design of three-dimensional and multilevel magnetic recording", Journal of Applied Physics 100, 063907 2006.

* cited by examiner

*Primary Examiner* — Ali Neyzari
(74) *Attorney, Agent, or Firm* — Thomas R. Berthold

(57) ABSTRACT

A thermally-assisted recording (TAR) patterned-media magnetic recording disk drive has a perpendicular patterned-media disk with multilevel data islands and a laser capable of supplying multiple levels of output power to a near-field transducer (NFT). If there are only two cells in each island, each island is formed of an upper cell of magnetic material with a coercivity $H_{C1}$ and a Curie temperature $T_{C1}$, a lower cell of magnetic material with a coercivity $H_{C2}$ and a Curie temperature $T_{C2}$ greater than $T_{C1}$, and a nonmagnetic spacer layer between the two cells. Each cell is formed of high-anisotropy material so as to have an anisotropy field greater than the magnetic write field. The TAR laser is capable of supplying at least two levels of output power to the NFT to allow the islands to be heated to two distinct temperatures so that the two cells in an island can be written so as to have either the same or opposite magnetizations.

14 Claims, 6 Drawing Sheets

THERMALLY-ASSISTED RECORDING (TAR) DISK DRIVE WITH PATTERNED MULTILEVEL MEDIA AND LASER WITH POWER MODULATION

BACKGROUND OF THE INVENTION

1. Field of the Invention

This invention relates to a thermally-assisted recording (TAR) type of magnetic recording hard disk drive that uses patterned media, wherein each data bit is stored in a magnetically isolated island on the disk, and more particularly to TAR disk drive with patterned multilevel media.

2. Description of the Related Art

Magnetic recording hard disk drives with patterned magnetic recording media, also called bit-patterned media (BPM), have been proposed to increase the data density. In patterned media, the magnetic material on the disk is patterned into small isolated data islands or islands arranged in concentric data tracks. Each island contains a single magnetic "bit" and is separated from neighboring islands by a nonmagnetic region. This is in contrast to conventional continuous media wherein a single "bit" is composed of multiple weakly-coupled neighboring magnetic grains that form a single magnetic domain and the bits are physically adjacent to one another. Patterned-media disks may be longitudinal magnetic recording disks, wherein the magnetization directions are parallel to or in the plane of the recording layer, or perpendicular magnetic recording disks, wherein the magnetization directions are perpendicular to or out-of-the-plane of the recording layer. To produce the required magnetic isolation of the patterned islands, the magnetic moment of the regions between the islands must be destroyed or substantially reduced so as to render these regions essentially nonmagnetic. Alternatively, the media may be fabricated so that that there is substantially no magnetic material in the regions between the islands.

A problem with magnetic recording materials used for both continuous and BPM is low thermal stability. As the magnetic grains become smaller to achieve ultrahigh recording density they become more susceptible to magnetic decay, i.e., magnetized regions spontaneously lose their magnetization, resulting in loss of data. This is attributed to thermal activation of the small magnetic grains and is called the superparamagnetic effect. The thermal stability of a magnetic grain is to a large extent determined by $K_u V$, where $K_u$ is the magnetic anisotropy constant of the magnetic recording material and V is the volume of the magnetic grain. Thus recording material with a high $K_u$ is important for thermal stability, although the $K_u$ cannot be so high as to prevent writing by the magnetic write field from the write head. To enable the use of high $K_u$ (high anisotropy) material, heat-assisted magnetic recording (HAMR), also called thermally-assisted recording (TAR), has been proposed. In TAR systems, an optical waveguide with a near-field transducer (NFT) directs heat from a radiation source, such as a laser, to heat localized regions of the magnetic recording layer on the disk. The radiation heats the magnetic material locally to near or above its Curie temperature to lower the coercivity enough for writing to occur by the write head. TAR systems have also been proposed for disk drives with BPM, wherein each data island is heated simultaneously with the application of the write field from the write head.

Multilevel BPM has been proposed, wherein each data island has multiple stacked magnetic cells that are magnetically decoupled from each other by nonmagnetic spacer layers. In multilevel BPM the data density is increased by a factor of $2^{(n-1)}$, where n is the number of cells in each island. U.S. Pat. No. 6,865,044 B1, assigned to the same assignee as this application, describes a disk drive with multilevel BPM having two magnetic cells in each data island, wherein the upper cell is written to in the conventional manner with a magnetic write field, and both the upper and lower cells are written to using TAR by heating the cells. However, this type of disk drive suffers from the problem of bit addressability because the write field or fringe fields can overwrite data in the upper cells of the closely-spaced data islands near the data island being written to. The overwriting is more likely to occur because patterned perpendicular media may have a wide distribution of the switching field, i.e., the write field required to switch the magnetization of an island from one magnetic state to the other state. Since the magnetic field gradients of the recording head are finite, the residual magnetic field on the neighboring islands can cause unintentional overwriting of the upper cells on these islands. BPM recording with TAR alleviates this problem because the physical separation among islands reduces lateral heat flow and provides a larger effective write gradient. Additionally, because the upper cells must have a coercivity low enough to be written to by a conventional write head, they cannot be formed of high anisotropy material, which is desirable to achieve media with high thermal stability.

What is needed is a disk drive with multilevel BPM that does not suffer from the problems of bit addressability and low thermal stability.

SUMMARY OF THE INVENTION

The invention relates to a thermally-assisted recording (TAR) patterned-media magnetic recording disk drive with a perpendicular patterned-media disk having multilevel data islands and a laser capable of supplying multiple levels of output power to the near-field transducer (NFT). Each data island contains at least two magnetic cells, each with perpendicular magnetic anisotropy, separated by nonmagnetic spacer layers. In an embodiment where there are only two cells in each island, each island is formed of an upper cell of magnetic material with a coercivity $H_{C1}$ and a Curie temperature $T_{C1}$, a lower cell of magnetic material with a coercivity $H_{C2}$ and a Curie temperature $T_{C2}$, and a nonmagnetic spacer layer that separates and magnetically decouples the two magnetic cells. Each cell represents a single magnetized bit and is separated from the other cell in its island by the nonmagnetic spacer layer. Each cell is formed of high-anisotropy material so as to have an anisotropy field greater than the magnetic write field. This assures that all magnetic cells have high thermal stability. Both $H_{C1}$ and $H_{C2}$ are greater than the magnetic write field at normal disk drive operating temperature (i.e., approximately 275 to 335 Kelvin) when the cells are not being written to, and $T_{C2}$ is greater $T_{C1}$.

Both the upper and lower cells may be formed of a pseudo-binary alloy FeXPt based on the FePt $L1_0$ phase, wherein X is selected from Cu and Ni. In these alloys, as the Cu or Ni is increased there is a reduction in magnetocrystalline anisotropy and Curie temperature. The amount of Cu or Ni present in the material of the upper cells is greater than the amount of Cu or Ni present in the material of the lower cells to assure that $T_{C2}$ is greater than $T_{C1}$.

Because each cell within a data island has a different $T_C$, independent data can be written to each cell by supplying multiple levels of output power to the NFT. If there are only two cells in each island then only two power levels (a low level P1 and a high level P2) are required. The two different optical power levels allow the islands to be heated to two distinct temperatures by the NFT. The laser power level is thus responsive to the value of the data to be written, i.e., whether the two cells in an island are to have the same or opposite magnetizations. If they are to have the same or parallel magnetizations then high laser power P2 is selected for a single pass of the island past the write head and NFT. If they are to have the opposite or antiparallel magnetizations then high laser power P2 is selected for a first write pass followed by the selection of low laser power P1 for the second write pass.

For a fuller understanding of the nature and advantages of the present invention, reference should be made to the following detailed description taken together with the accompanying figures.

DETAILED DESCRIPTION OF THE INVENTION

Figure 1:
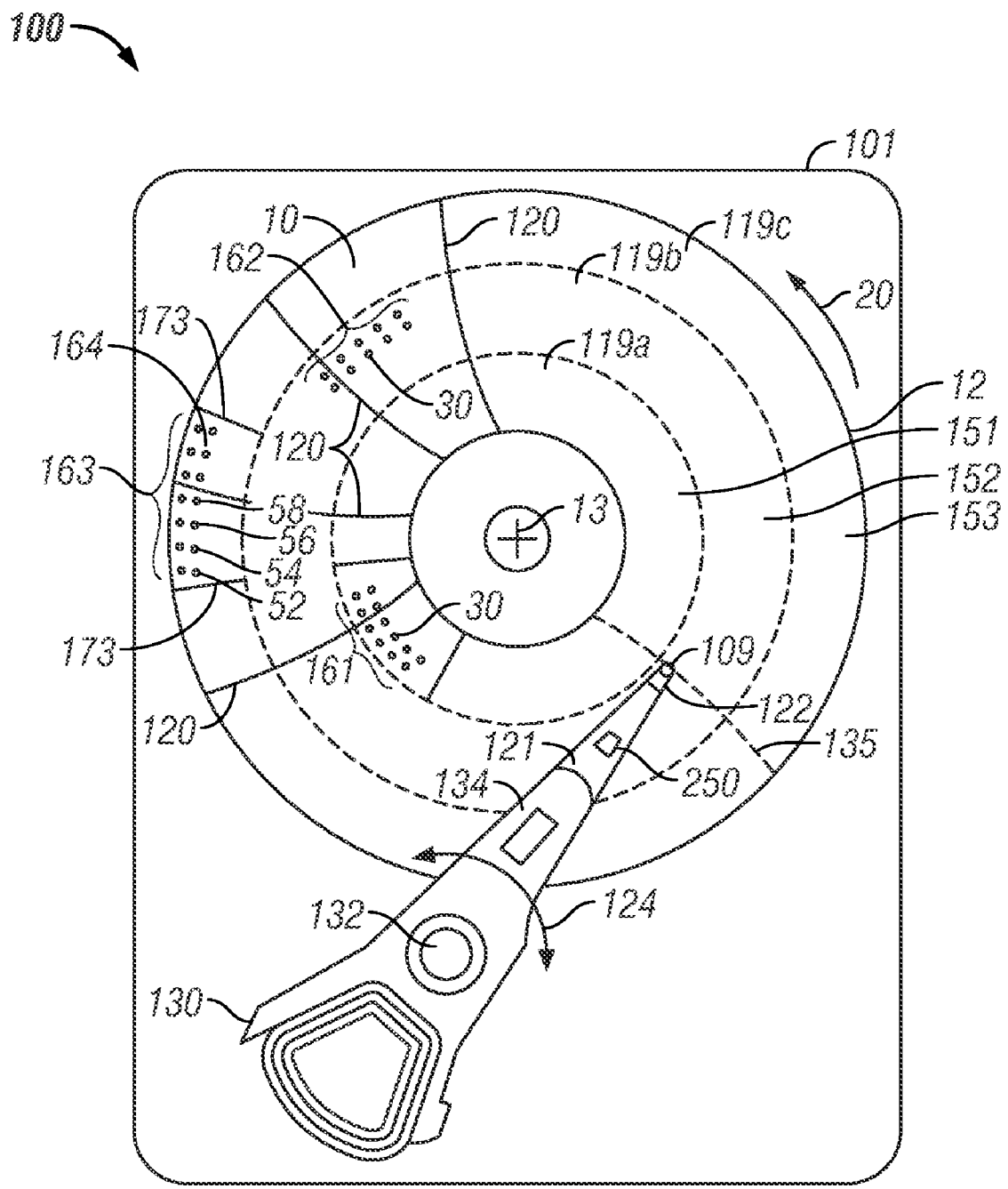
FIG. 1 is a top view of a patterned-media TAR disk drive according to the invention.

FIG. 1 is a top view of a thermally-assisted recording (TAR) patterned-media disk drive 100 according to the invention. The drive 100 has a housing or base 101 that supports an actuator 130 and a spindle motor (not shown) for rotating the patterned magnetic recording disk 10 about its center 13. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier, such as an air-bearing slider 122, attached to the other end of suspension 121. The suspension 121 permits the head carrier 122 to be maintained very close to the surface of disk 10. The slider 122 supports the read/write or recording head 109. The recording head 109 is typically a combination of an inductive write head with a magnetoresistive read head (also called a read/write head) and is located on the trailing end or end face of the slider 122. The TAR radiation source is laser 250, which is depicted as being supported on suspension 121 but alternatively could be supported on arm 134 or slider 122. The slider 122 supports an optical channel or waveguide and near-field transducer (NFT) (not shown in FIG. 1) for directing radiation from laser 250 to the disk 10. Only one disk surface with associated slider and recording head is shown in FIG. 1, but there are typically multiple disks stacked on a hub that is rotated by a spindle motor, with a separate slider and recording head associated with each surface of each disk.

The patterned magnetic recording disk 10 includes a disk substrate 12 with a generally planar surface that supports discrete multilevel data islands. The data islands, represented as small circles in FIG. 1, like typical data islands 52, 54, 56, 58 have multiple stacked cells that function as discrete magnetic bits for the storage of data. Each discrete data island is separated from other islands by nonmagnetic regions or spaces. The term "nonmagnetic" means that the spaces between the data islands are formed of a nonferromagnetic material, such as a dielectric, or a material that has no substantial remanent moment in the absence of an applied magnetic field, or a magnetic material in a groove or trench recessed far enough below the blocks to not adversely affect reading or writing. The nonmagnetic spaces between the data islands may also be the absence of magnetic material, such as grooves or troughs in the magnetic recording layer or disk substrate.

The data islands are arranged in radially-spaced circular tracks, with the tracks being grouped into annular bands or zones 151, 152, 153. Within each track, the data islands are typically arranged in data sectors, with the number of data sectors being different in each zone. The grouping of the data tracks into annular zones permits banded recording, wherein the angular spacing of the data islands, and thus the data rate, is different in each zone. In FIG. 1, three zones 151, 152, 153 are shown, with only portions of representative concentric data tracks, 161, 162, 163, being shown for each respective zone. While only three zones are depicted in FIG. 1, modern disk drives typically have about 20 zones. In each zone there are also dedicated nondata regions that contain generally radially-directed synchronization (sync) marks, like typical sync marks 173 in zone 153. Each sync mark 173 may be a plurality of circumferentially-spaced marks, with the spacing being different in each zone, that are detected by the read head to enable the write head to be synchronized with the specific spacing of the data islands in that zone. The data regions between successive sync marks in each zone, like data region 164 between sync marks 173 in zone 153, typically include a fixed number of data sectors. The sync marks may be located in the sector headers of certain data sectors. The physical location where data is to be written or read is identified by a head number, track number (also called "cylinder" number when there are multiple disks) and data sector number.

As the disk 10 rotates about its center 13 in the direction of arrow 20, the movement of actuator 130 allows the read/write head 109 on the trailing end of head carrier 122 to access different data tracks and zones on disk 10. Because the actuator 130 is a rotary actuator that pivots about pivot 132, the path of the read/write head 109 across the disk 10 is not a perfect radius but instead an arcuate line 135.

Each data track also includes a plurality of circumferentially or angularly-spaced dedicated nondata servo regions or sectors 120 that contain positioning information detectable by the read head for moving the head 109 to the desired data tracks and maintaining the head 109 on the data tracks. The servo sectors in each track are aligned circumferentially with the servo sectors in the other tracks so that they extend across the tracks in a generally radial direction, as represented by radially-directed servo sectors 120. The servo sectors 120 have an arcuate shape that generally replicates the arcuate path 135 of the head 109. The servo sectors 120 are nondata regions on the disk that are magnetized once, typically during manufacturing or formatting of the disk, and are not intended to be erased during normal operation of the disk drive. While the sync marks (like sync marks 173) may be located in the sector headers for the data sectors, as an alternative they may be located in the servo sectors 120.

Figure 2:
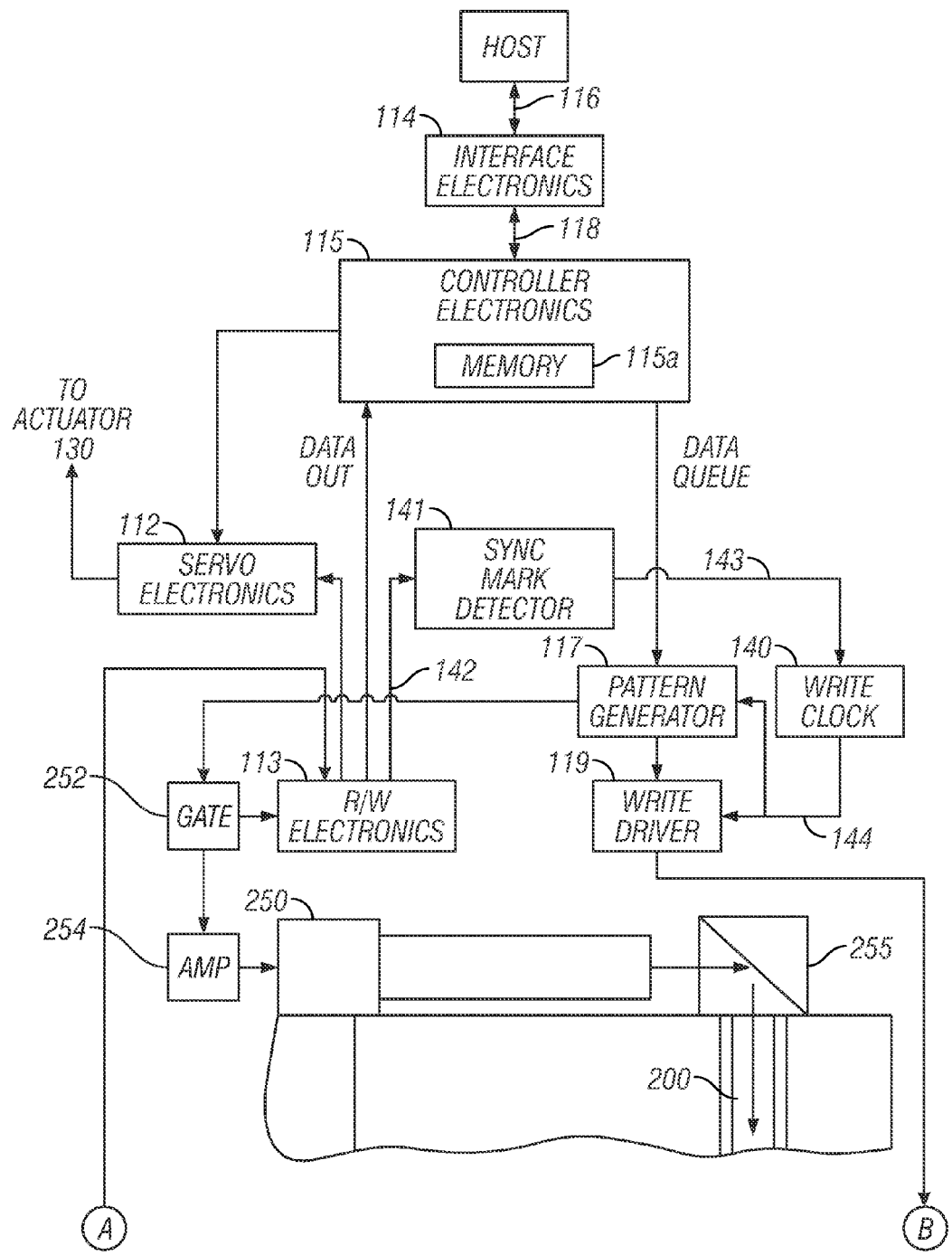
FIG. 2 is a block diagram of the electronics associated with the disk drive of this invention and also shows a sectional view of the patterned magnetic recording disk and a portion of the air-bearing slider supporting the read head, write head and near-field transducer (NFT).
Figure 2:
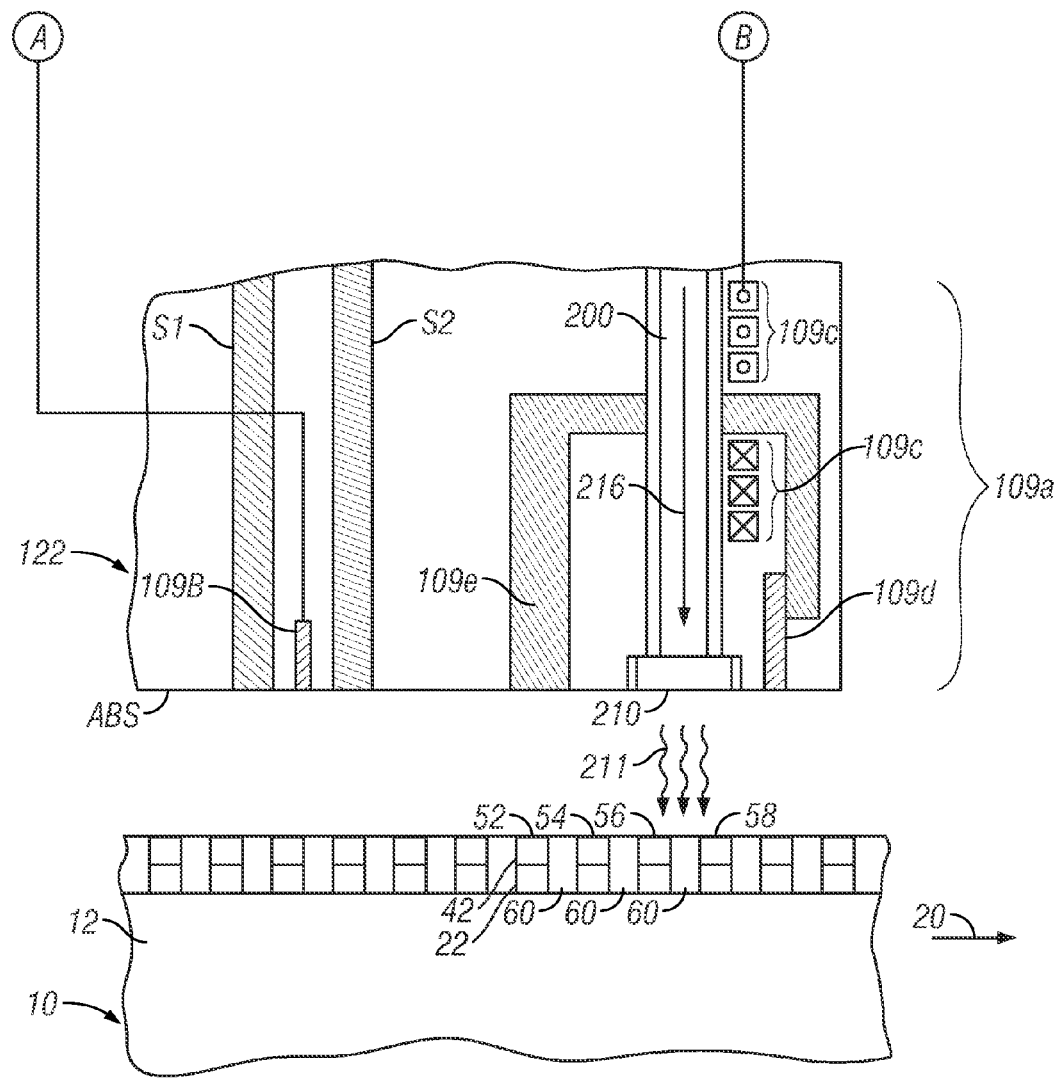

FIG. 2 is a block diagram of the electronics associated with TAR disk drive 100 and also shows a sectional view of the magnetic recording disk 10 with a magnetic recording layer of patterned media in the form of discrete magnetizable multilevel data islands, like typical islands 52, 54, 56, 58, separated by nonmagnetic regions or spaces 60. In the TAR disk drive of this invention, each data island includes multiple stacked cells, each of which is magnetizable in one of two perpendicular directions, like typical island 52 with lower cell 22 and upper cell 42. FIG. 2, which is not drawn to scale because of the difficulty in showing the very small features, also shows a sectional view of a portion of slider 122 with its disk-facing surface or air-bearing surface (ABS). The slider 122 supports the magnetoresistive read head 109b located between magnetic shields S1 and S2, perpendicular write head 109a, laser 250, mirror 255, optical channel 200 and NFT 210. The write head 109a is an inductive coil write head that includes coil 109c, write pole 109d at the ABS and return pole 109e. The writing of data (the switching of the magnetization direction of a cell in an island) occurs when the write pole 109d directs the magnetic write field to a cell that has been heated (represented by the wavy arrows 211) by NFT 210.

As shown in FIG. 2, the laser 250 and mirror 255 may be located on the top surface of slider 122. Alternatively, these optical elements may be located on the actuator arm 134 or suspension 121 (FIG. 1) or at other locations in the disk drive, with the radiation directed from the laser through an optical fiber or waveguide. The laser 250 may be a surface-emitting diode laser, for example a CD-RW type diode laser that provides optical radiation with a wavelength of approximately 780 nm.

The NFT 210 is located at the output of optical waveguide or channel 200 at the ABS of the slider 122. The laser 250 directs radiation to a mirror 255 and then through optical waveguide 200, as shown by arrow 216. The radiation strikes the NFT 210, creating concentrated near-field radiation to the islands as the disk rotates in the direction 20 past the slider 122. A "near-field" transducer, as used herein, refers to "near-field optics", wherein the passage of light is to, from, through, or near an element with subwavelength features and the light is coupled to a second element located a subwavelength distance from the first. NFTs typically use a low-loss metal (e.g., Au, Ag, Al or Cu) shaped in such a way to concentrate surface charge motion at a surface feature shaped as a primary apex or tip. Oscillating tip charge creates an intense near-field pattern. Sometimes, the metal structure can create resonant charge motion, called surface plasmons or local plasmons, to further increase intensity. The electromagnetic field of the oscillating tip charge then gives rise to optical output in the near field, which is directed to the data islands on the disk. The NFT 210 has features less than the wavelength of the radiation from laser 250 and the spacing between the NFT 210 and the islands is less than the wavelength of the radiation from the laser 250.

Figure 3:
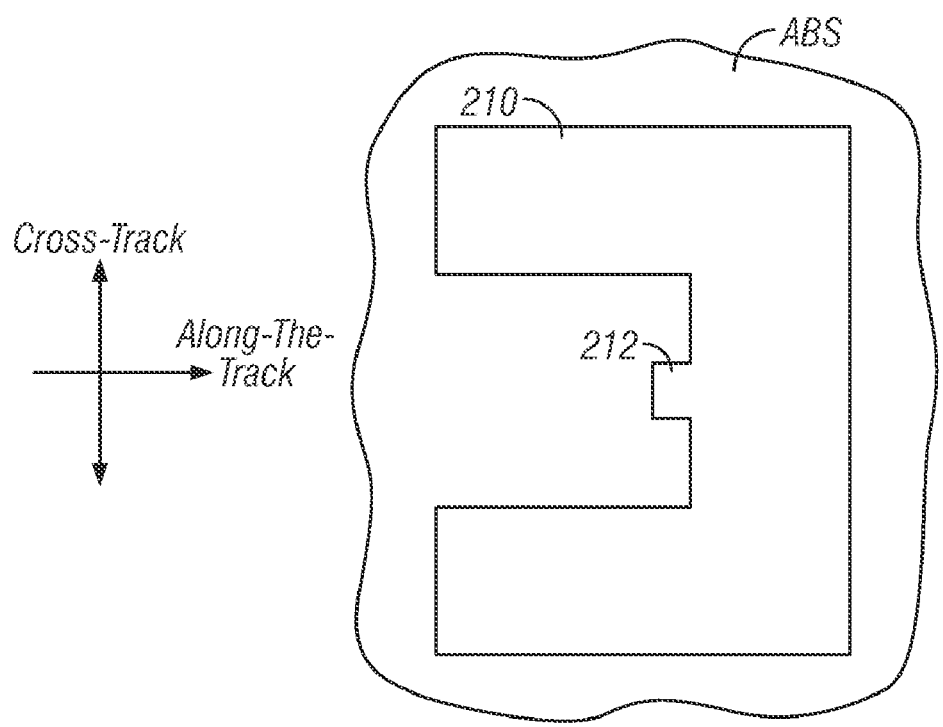
FIG. 3 is a view of the NFT as seen from the disk and depicts the NFT as an "E" shaped antenna with a primary tip.

FIG. 3 is a view of the NFT 210 as seen from the disk and depicts the NFT 210 as an "E" shaped antenna with a primary tip 212. The "E" shape and the shape of the tip may be formed by e-beam lithography or optical lithography. The height of the metal film of the NFT 210 perpendicular to the substrate plane has a dimension preferably between about 75 to 125 nm. The distance between the inside corners of the NFT 210 in the cross-track direction may have a dimension of about 250 to 400 nm and the distance between the base of the two tips may be about 100 to 180 nm. The tip 212 has a cross-track width of about 10-40 nm and an along-the-track length of about 20-50 nm. The wavelength of the laser may be in the range 750 nm to 1000 nm to be matched to these E-antenna dimensions. When polarized light is aligned with the primary tip 212 of the E-antenna, an intense near-field pattern is created at the end of the tip 212. Resonant charge motion can occur at the primary tip 212 by adjusting the E-antenna dimensions to match a local plasmon frequency with the incident light wavelength. The NFT 210 focuses the input optical power to a very small spot on the surface of the disk adjacent the primary tip 212.

Referring again to FIG. 2, the disk drive electronics include read/write (R/W) electronics 113, servo electronics 112, data controller electronics 115 and interface electronics 114. The R/W electronics 113 receives signals from read head 109b and passes servo information from the servo sectors 120 (FIG. 1) to servo electronics 112 and data signals from the data sectors in data regions 164 (FIG. 1) to controller electronics 115. Servo electronics 112 typically includes a servo control processor that uses the servo information from the servo sectors 120 to run a control algorithm that produces a control signal. The control signal is converted to a current that drives rotary actuator 130 to position the head 109. Interface electronics 114 communicates with a host system over interface 116, passing data and command information. Interface electronics 114 also communicates with controller electronics 115 over interface 118. Interface electronics 114 receives a request from the host system, such as a personal computer (PC), for reading from or writing to the data sectors over interface 116. Controller electronics 115 includes a microprocessor and associated memory 115a. Controller electronics 115 receives a list of requested data sectors from interface electronics 114 and converts them into a set of numbers that uniquely identify the disk surface (head number associated with that disk surface), track and data sector. The numbers are passed to servo electronics 112 to enable positioning head 109 to the appropriate data sector.

FIG. 2 also illustrates the transfer of data between a host system, such as a PC, and the disk drive. The signals from recorded data islands in the data sectors are detected by read head 109b, and amplified and decoded by read/write electronics 113. Data is sent to controller electronics 115 and through interface electronics 114 to the host via interface 116. The data to be written to the disk 10 is sent from the host to interface electronics 114 and controller electronics 115 and then as a data queue to pattern generator 117 and then to write driver 119. The write driver 119 generates high-frequency current pulses to the coil of write head 109a which results in the magnetic write fields that magnetize the cells in the data islands. The write clock 140, which is capable of operating at different frequencies corresponding to the different data zones, outputs a clock signal on line 144 to control the timing of pattern generator 117 and write driver 119. A sync mark detector 141 receives the readback signal from R/W electronics 113 on input line 142 and outputs a signal on line 143 to control the timing of write clock 140. The sync mark detector 141 detects the sync marks (like sync marks 173 in FIG. 1) from R/W electronics 113. The sync mark spacing in each zone is different so sync mark detector 141 enables the write clock 140 to be synchronized with the spacing of the data islands in each of the different zones.

In the TAR disk drive of this invention, because each data island includes multiple stacked cells, each of which is magnetizable in one of two perpendicular directions, the laser 250 is capable of supplying multiple levels of output power. The laser power level is modulated by pattern generator 117, which generates a digital signal to a gate 252 which controls a laser amplifier 254. If there are only two cells in each island then only two power levels (a low level P1 and a high level P2) are required. Thus, depending on the values of the data in the data queue received by pattern generator 117, the pattern generator 177 outputs a 0 or a 1 to gate 252, which then sets amplifier 254 to a high or low level to cause laser 250 to output laser power at level P1 or P2. This results in two different optical power levels at the NFT 210 so that the islands can be heated to two distinct temperatures. The laser power level is thus responsive to the value of the data to be written, i.e., whether the cells in an island are to have the same or opposite magnetizations. As will be explained below, if they are to have the same or parallel magnetizations then the data queue will result in the selection of laser power P2 and a single pass of the island past the write head and NFT. If they are to have the opposite or antiparallel magnetizations then the data queue will result first in the selection of laser power P2 and a first pass of the island past the write head and NFT, followed by the selection of laser power P1 and a second pass of the island past the write head and NFT.

Figure 4:
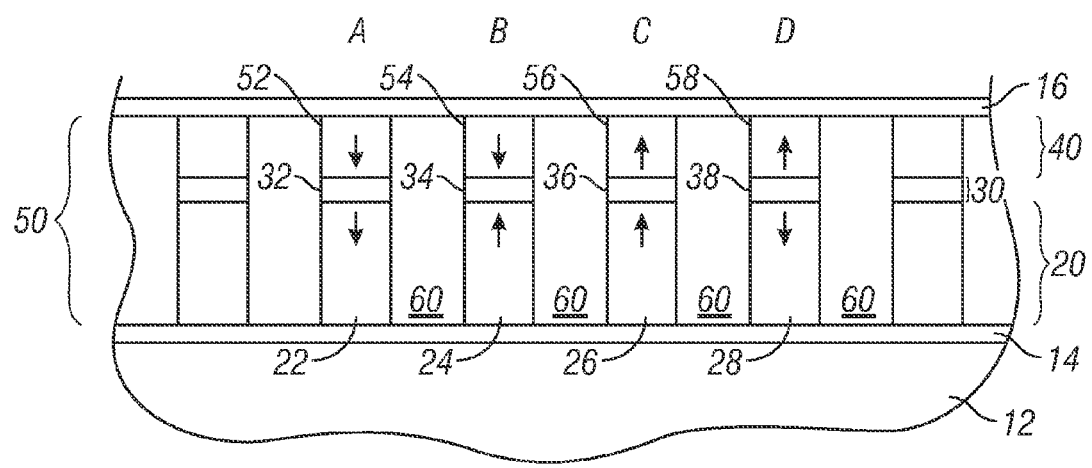
FIG. 4 is a sectional view of the multilevel patterned magnetic recording medium according to the invention.

FIG. 4 is a sectional view of the multilevel patterned magnetic recording medium according to the invention. The medium includes a substrate 12, a multilevel perpendicular magnetic recording layer 50, an optional underlayer 14 and optional protective overcoat 16. The recording layer 50 includes a plurality of islands, such as representative islands 52, 54, 56, 58, spaced-apart by nonmagnetic spaces 60. In an embodiment where there are only two cells in each island, then each island is formed of a first lower layer 20 of magnetic material with perpendicular magnetic anisotropy, a second upper layer 40 of magnetic material with perpendicular magnetic anisotropy and a nonmagnetic spacer layer 30 that separates and magnetically decouples the two magnetic layers 20, 40 in each island. Each island is thus a multilevel magnetic island with at least two stacked magnetically decoupled cells, such as cells 22, 42 in island 52. Each cell represents a single magnetized bit and is separated from the other cell in its island by the spacer layer 30 and from the cells in other islands by the regions depicted as spaces 60.

Each cell is formed of high-anisotropy material so as to have an anisotropy field greater than the magnetic write field. This assures that all magnetic cells have high thermal stability. The highest cells in the stack (cells 42, 44, 46, 48) are formed of a material with perpendicular magnetic anisotropy, a coercivity $H_{C1}$ and a Curie temperature $T_{C1}$. The lowest cells in the stack (cells 22, 24, 26, 28) are formed of a material with perpendicular magnetic anisotropy, a coercivity $H_{C2}$ and a Curie temperature $T_{C2}$. Both $H_{C1}$ and $H_{C2}$ are greater than the magnetic write field at normal disk drive operating temperature (i.e., approximately 275 to 335 Kelvin) when the cells are not being written to. Also, it is required that $T_{C2}$ be greater $T_{C1}$. The Curie temperature of a ferromagnetic material is the reversible point above which it becomes paramagnetic. Below the Curie temperature the magnetic moments are aligned parallel within magnetic domains in the ferromagnetic material. As the temperature is increased to near the Curie point, the alignment (magnetization) within each domain decreases. Above the Curie temperature, the material is paramagnetic so that magnetic moments are in a completely disordered state.

The spaces 60 define the regions between the magnetic islands and are typically formed of nonmagnetic material, but may be formed of ferromagnetic material provided the material does not adversely affect the signal recording and detection from the magnetic islands that they separate. The magnetic islands can be formed by first lithographically patterning the substrate, depositing the layers making up recording layer 50 over the patterned resist and then removing the resist, leaving the magnetic islands. Alternatively, the magnetic islands can be formed by first depositing the layers making up recording layer 50 on the substrate, lithographically patterning the recording layer, etching the recording layer through the lithographic mask, and then removing the resist, leaving the magnetic islands. In both examples, the spaces 60 in the regions between the islands are voids that may be filled with nonmagnetic filler material, such as alumina or a polymeric material, to substantially planarize the disk 10. The planarization process would involve first forming the magnetic islands, then depositing the filler to a thickness greater than that required to fill the spaces 60, and then polishing the filler material with a chemical-mechanical-polishing (CMP) process. This leaves the tops of the spaces 60 and the tops of the magnetic islands approximately coplanar, after which an optional overcoat 16 may be sputter deposited.

As shown by the representative letters A, B, C, D and the arrows in the cells in FIG. 4 there are four possible magnetic levels or states in each island, each magnetic state depending on the direction of magnetization (magnetic moment) in each magnetic cell. Each magnetic state in the two-layer embodiment of FIG. 4 can thus be represented as a two-bit byte or word. If the cells in the lower layer 20 are selected as the first bit in the byte or word and magnetization in the up direction is considered a 0, then the magnetic states are as follows:

A: [1,1]
B: [0,1]
C: [0,0]
D: [1,0]

FIG. 4 is depicted with two magnetic layers, but 3 or more magnetic layers are possible. For example, if there are 3 magnetic layers, and thus 3 cells stacked in each island, the intermediate cells in the stack would also be formed of a material with perpendicular magnetic anisotropy and a coercivity $H_{C3}$ greater than the magnetic write field, but with a Curie temperature $T_{C3}$, wherein $T_{C3}$ is greater than $T_{C1}$ and less than $T_{C2}$. The total readback signal integrated over the n different magnetic layers gives rise to $2^n$ different signal levels, which can be used for magnetic recording. The recording density is thus increased by a factor of $2^{(n-1)}$.

The spacer layer 30 may be a nonmagnetic material while thermally conductive, provided it is thick enough to assure that the magnetic cells in the islands are magnetically decoupled. Materials that may be used for the spacer layer include MgO, $SiO_2$, $Al_2O_3$, Pt, Cu, Ag, Au and Ru.

The magnetic material in the cells may be any type of magnetic recording material and structure that provides perpendicular magnetic anisotropy. The magnetic cells may thus be a metallic multilayer with perpendicular magnetic anisotropy, like a Co/Ni, Co/Pt, Co/Pd, Fe/Pt or Fe/Pd multilayer. The magnetic cells may also be formed of a granular polycrystalline cobalt-platinum-chromium (CoPtCr) alloy grown on a growth-enhancing sublayer that induces the crystalline C-axis to be perpendicular to the plane of the layer, so that the layer has strong perpendicular magnetocrystalline anisotropy. The magnetic cells may also be one of the well-known chemically-ordered binary alloys CoPt, CoPd, FePt, FePd, $CoPt_3$, $CO_3Pt$, $CoPd_3$ and $CO_3Pd$ or pseudo-binary alloys based on the CoPt and FePt $L1_0$ phase. Chemically-ordered alloys of CoPt, CoCrPt, CoPd, FePt and FePd (all ordered in $L1_0$ or $L1_1$) and $CoPt_3$, $CO_3Pt$ and $CoPd_3$ (all ordered in $L1_2$) in their bulk form, are known for their high magnetocrystalline anisotropy and magnetization, properties that are desirable for high-density magnetic recording materials. The magnetic cells may also be formed any of the known amorphous materials that exhibit perpendicular magnetic anisotropy, such as CoSm, TbFe, TbFeCo, and GdFe alloys.

However, the preferred materials for the cells is a FeXPt alloy based on the FePt $L1_0$ phase, wherein X is selected from Cu and Ni. In these alloys, as the Cu or Ni is increased there is a reduction in magnetocrystalline anisotropy and Curie temperature. More specifically, this type of material is a pseudo-binary alloy based on the FePt $L1_0$ phase, e.g., $(Fe_{(y)}$ $Pt_{(100-y)}$)—X, where y is between about 44 and 55 atomic percent and the element X may be Cu, Ni or Ag and is present in the range of between about 1 to about 20 atomic percent. While the pseudo-binary alloy in general has similarly high anisotropy as the binary alloy FePt, the addition of Cu or Ni allows additional control over the magnetic properties of the material, specifically a reduction in magnetocrystalline anisotropy and Curie temperature. The properties of FePt—Cu alloys have been described by J. Ikemoto et al., "Control of Curie Temperature of FePt(Cu) Films Prepared From Pt(Cu)/Fe Bilayers", *IEEE Transactions on Magnetics*, Volume 44, issue 11, November 2008, pp. 3543-3546; and S. D. Willoughby, "Electronic and magnetic properties of $Fe_{1-x}Cu_xPt$", *J. Appl. Phys.* 95, 6586 (2004). The properties of FePt—Ni alloys have been described by J. Thiele et al., "Temperature dependent magnetic properties of highly chemically ordered $Fe_{55-x}Ni_xPt_{45}L1_0$ films", *J. Appl. Phys.* 91, 6595 (2002).

Regardless of the magnetic material used for the cells, the important features are the relative values of Curie temperature and the values of coercivity greater than the write field. The high coercivity assures that the cells can have their magnetizations switched only when the write field is applied while the cells are heated to near or above their respective Curie temperatures. When the temperature of either cell is substantially below its Curie temperature, for example at room temperature or normal disk drive operating temperature (about 275 to 335 K), the write field is too low to switch the magnetization of either cell. The relative values of Curie temperature assure that when the highest cells have their magnetizations switched while being heated at low laser power, the lowest cells do not have their magnetizations switched.

In one example of a two-level medium, both the upper and lower cells may be formed of $FeCu_xPt$, where x is greater than or equal to 1 atomic percent and less than or equal to 20 atomic percent, with a thickness of about 5 nm. The addition of Cu to FePt decreases the Curie temperature with only a small decrease in magnetic anisotropy. The amount of Cu present in the material of the upper cells is greater than the amount of Cu present in the material of the lower cells. This assures that $T_{C2}$ is greater than $T_{C1}$. By appropriate selection of the amount of Cu this results in upper cells with $H_{C1}$ of 30 kOe and $T_{C1}$ of 625 K, and lower cells with $H_{C2}$ of 35 kOe and $T_{C2}$ of 720 K. These $FeCu_xPt$ materials have a high anisotropy of 80 kOe for the upper cells and 100 kOe for the lower cells, each of which is substantially higher than the write field of 10 kOe and thereby assures that the thermal profile from the NFT determines the track width. The upper and lower cells may also be formed of FeNiPt alloys with appropriate selection of the amounts of Ni because, like FeCuPt alloys, the addition of Ni to FePt decreases the magnetocrystalline anisotropy and Curie temperature. Also, the lower cells may be formed of the chemically-ordered binary alloy FePt with the upper cells being formed of FeCuPt or FeNiPt alloys.

Figure 5A:
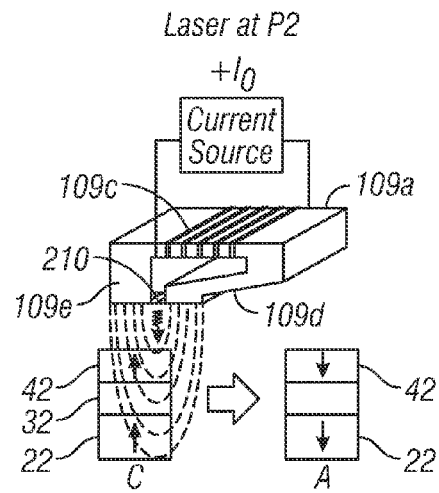
FIGS. 5A-5D are illustrations of the manner in which a discrete data island having two magnetic cells is written to in order to record each of the four possible magnetic states A-D, respectively.

FIGS. 5A-5D illustrate the manner in which a typical magnetic island 52 having two magnetic cells 22, 42 is written to in order record each of the four possible magnetic states A-D. Referring first to FIG. 5A, the write head 109a is a perpendicular head and has a coil 109c connected to a current source that provides a fixed write current $I_0$. The current source is part of the write driver 119 (FIG. 2) that also includes switching circuitry to generate bi-directional write pulses with plus or minus current levels, $I_0$. The NFT 210 is depicted as being located between the write pole 109d and the return pole 109e. The write current $I_0$ generates a generally perpendicular magnetic write field $H_w$ from the write pole 109d that returns back to the return pole 109e. In the two-layer medium, the lower magnetic cell 22 has a Curie temperature $T_{C2}$ greater than the Curie temperature $T_{C1}$ of the upper magnetic cell 42, and preferably a coercivity $H_{C2}$ greater than the coercivity $H_{C1}$ of the upper magnetic cell 42. Both $H_{C1}$ and $H_{C2}$ are greater than the magnetic write field $H_w$ at normal disk drive operating temperature (i.e., approximately 275 to 335 K) when the cells are not being written to.

FIG. 5A illustrates the writing process to generate magnetic state A [1,1], wherein the magnetizations in cells 22 and 42 are parallel and oriented down. This is achieved by high laser output power P2 to enable NFT 210 to heat lower cell 22 to near or above $T_{C2}$, which also heats upper cell 42 to above $T_{C1}$. This reduces the coercivities of both layers to below $H_w$. The write field $H_w$ is generated by current $I_0$. A positive $I_0$ current pulse in combination with laser power P2 to NFT 210 changes the magnetization directions in both layers 22, 42 and generates the A state. Similarly, as shown in FIG. 5B, a negative $I_0$ current pulse in combination with laser power P2 to NFT 210 changes the magnetization directions in both layers 22, 42 and generates the C [0,0] state, wherein the magnetizations in cells 22 and 42 are parallel and oriented up. The writing process to generate magnetic states A and C requires only a single pass of the medium past the write head 109a and NFT 210.

Figure 5C:
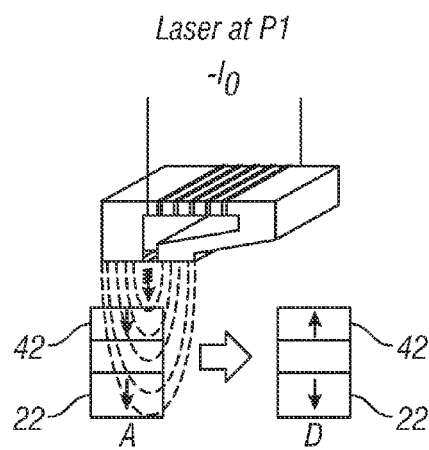
Figure 5B:
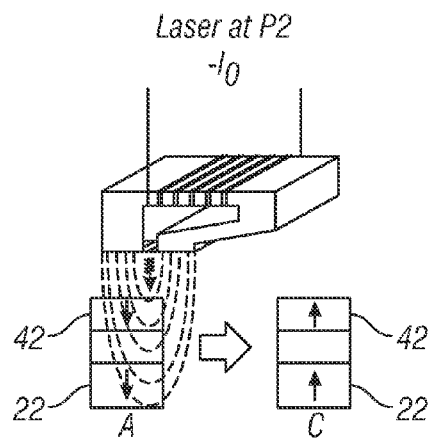

FIG. 5C illustrates the writing process to generate magnetic state D [1,0], wherein the magnetizations are antiparallel, i.e., the magnetization of lower cell 22 is down and the magnetization of upper cell 42 is up. To generate the D state, the island must first be in the A state, which requires a first pass of the medium past the write head 109a and NFT 210 with laser power at P2 in the presence of a positive current $I_0$ pulse that generates $H_w$. Then in a second pass of the medium, a low laser output power P1 is applied, which is sufficient to enable NFT 210 to heat upper cell 42 to near or above $T_{C1}$ without heating lower cell 22 to near $T_2$. This reduces the coercivity $H_{C1}$ of upper cell 42 to below the write field $H_w$ without lowering the coercivity $H_{C2}$ of lower cell 22 to below the write field $H_w$. The write field is thus insufficient to change the magnetization of lower cell 22. The write field $H_w$ is generated by a negative $I_0$ current pulse, which in combination with laser power P1 to NFT 210 changes the magnetization in just upper cell 42, and generates the D state.

Figure 5D:
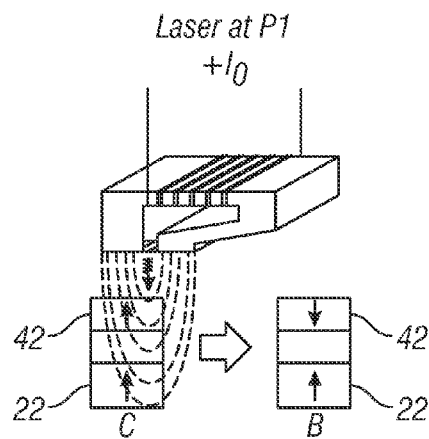

FIG. 5D illustrates the writing process similar to that shown in FIG. 5C, but to generate magnetic state B [0,1], wherein the magnetization of lower cell 22 is up and the magnetization of upper cell 42 is down. To generate the B state, the island must first be in the C state, which requires a first pass of the medium past the write head 109a and NFT 210 with laser power at P2 in the presence of a negative current $I_0$ pulse that generates $H_w$. Then in a second pass of the medium, a low laser output power P1 is applied, which is sufficient to enable NFT 210 to heat upper cell 42 to near or above $T_{C1}$ without heating lower cell 22 to near $T_{C2}$. This reduces the coercivity $H_{C1}$ of upper cell 42 to below the write field $H_w$ without lowering the coercivity $H_{C1}$ of lower cell 22 to below the write field $H_w$. The write field is thus insufficient to change the magnetization of lower cell 22. The write field $H_w$ is generated by a positive $I_0$ current pulse, which in combination with laser power P1 to NFT 210 changes the magnetization in just upper cell 42, and generates the B state.

A substantial difference in Curie temperatures of the lower magnetic cells and the upper magnetic cells ($T_{C2}$ greater than the coercivity $T_{C1}$) will assure that only the magnetization of the upper cell in the island is switched in the presence of $H_w$ when the laser is at lower power level P1. Generally this means there will also be a substantial difference in coercivities of the lower magnetic cells and the upper magnetic cells ($H_{C2}$ greater than the coercivity $H_{C1}$). For the specific example described above, the upper cells are FeCu$_x$Pt with $T_{C1}$ of 625 K and $H_{C1}$ of 30 kOe, and the lower cells are FeCu$_y$Pt (where x is greater than y) with $T_{C2}$ of 720 K and $H_{C2}$ of 35 kOe. A fixed write current pulse $I_0$ of 60 mA will generate a magnetic write field $H_w$ of approximately 10 kOe. A laser power level P1 of 5 mW having 5% coupling efficiency with the output of the NFT will increase the temperature of the upper cell 70 to approximately 650 K, which will reduce $H_{C1}$ to approximately 0 Oe. A laser power level P2 of 10 mW will increase the temperature of both layers to more than 750 K, which will reduce $H_{C1}$ to approximately 0 Oe and $H_{C2}$ to approximately 0 Oe. Preferably he difference between $T_{C2}$ and $T_{C1}$ is at least 100 K.

The above-described write process mitigates the problem of bit addressability because even if the write field or fringe fields from the write head interact with cells in islands near the island being addressed (written to), those cells cannot be overwritten because they are not exposed to heat from the NFT. Thus in this invention there is less concern that the patterned media have a narrow SFD, and accordingly less of a requirement to control the composition and thicknesses of the cells and islands during media fabrication.

The reading of the multiple magnetic states A-D requires the ability to detect the readback signal levels generated by the stacked magnetic cells. The remanent magnetization (Mr) and thickness (t) of each layer can be selected to maximize the readback signal difference between the $2^n$ possible magnetic states (where n is the number of stacked layers) recorded on one island. For a two layer system, the signal generated by the read head can be approximated as:

$$\text{Readback Signal}_1 \geq 2 * \text{Signal}_2 \qquad \text{Eq. (1)}$$

where 1 and 2 denominate the contributions of the top and bottom cells, respectively. To optimize the net difference between each cell's contribution, Signal$_1$ should preferably be at least twice Signal$_2$:

$$\text{Signal}_1 \geq 2 * \text{Signal}_2 \qquad \text{Eq. (2)}$$

or $$\alpha_1 * Mr_1 t_1 \geq 2 * \alpha_2 * Mr_2 t_2 \qquad \text{Eq. (3)}$$

where (Mrt) is the remanent magnetization-thickness product for a cell and $\alpha$ is the spacing loss factor (given by the read head geometry and the spacing between the read head, the magnetic layer, and possibly the soft under layer (SUL)). Thus, using the example above, the upper cells of FeCu$_x$Pt will have Mr$_2$ of 900 memu/cc and can have a thickness $t_1$ of 5 nm, and the lower cells of FeCu$_y$Pt will have Mr$_2$ of 1100 memu/cc and can have a thickness $t_2$ of 5 nm. The spacing loss factor $\alpha$ is approximately $\exp(-2\pi*\delta/L)$, where L is the island pitch in the along-the-track direction and $\delta$ is the spacing between the head and the top of the respective cell. As a result, the relationship of Eq. (3) can be achieved by the following relationship:

$$(Mr_1 t_1)/(Mr_2 t_2) \geq 2 * \exp(-2\pi * t_1/L) \qquad \text{Eq. (4)}$$

Thus proper selection of Mrt values and cell thicknesses, as well as spacer layer thickness, can be used to achieve the desired readback signal levels.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A thermally-assisted recording (TAR) patterned-media magnetic recording disk drive comprising:
   a rotatable magnetic recording disk having a plurality of concentric data tracks, each data track patterned into discrete data islands separated by nonmagnetic spaces, each island comprising at least two stacked magnetic cells having perpendicular magnetic anisotropy, each cell in an island being separated from the other cells in its island, the highest cell in the stack having a coercivity $H_{C1}$ and a Curie temperature $T_{C1}$ and the lowest cell in the stack having a coercivity $H_{C2}$ and a Curie temperature $T_{C2}$ greater than $T_{C1}$;
   a write head for applying to the data islands a magnetic write field less than $H_{C1}$ and $H_{C2}$;
   a laser light source capable of supplying at least two levels of laser output power;
   an optical channel and near-field transducer for directing radiation from the light source to the disk to heat the data islands; wherein a first level of laser power P1 heats the highest cell in an island to a temperature near $T_{C1}$ but less than $T_{C2}$ and a second level of laser power P2 heats the lowest and highest cells in an island to a temperature greater than $T_{C1}$ and near $T_{C2}$; and
   a carrier for supporting the write head and near-field transducer, the carrier having a disk-facing surface maintained at a distance less than the wavelength of the laser light from the disk.

2. The disk drive of claim 1 wherein each cell comprises a FeXPt alloy, wherein X is selected from Cu and Ni.

3. The disk drive of claim 1 wherein the lowest cell in a stack comprises the chemically-ordered binary alloy FePt.

4. The disk drive of claim 2 wherein the lowest cell in a stack comprises a FeCuPt alloy wherein the amount of Cu is greater than or equal to 1 atomic and less than or equal to 20 atomic percent and the highest cell in a stack comprises a FeCuPt alloy wherein the amount of Cu present is greater than the amount of Cu present in the lowest cell.

5. The disk drive of claim 1 wherein the difference between $T_{C2}$ and $T_{C1}$ is at least 100 K.

6. The disk drive of claim 1 wherein each island includes an intermediate cell between the lowest and highest cells in the stack of cells, the intermediate cell having a coercivity $H_{C3}$ and a Curie temperature $T_{C3}$ greater than $T_{C1}$ and less than $T_{C2}$; and wherein the laser light source is capable of supplying a third level of laser output power P3 greater than P1 and less than P2.

7. The disk drive of claim 1 further comprising a read head on the carrier for detecting a readback signal from the data islands, wherein the signal from the highest cell in an island is at least twice that of the signal from the lowest cell in an island.

8. The disk drive of claim 1 further comprising a read head on the carrier for detecting a readback signal from the data islands, wherein there are only two cells in each island, wherein the highest cell has a remanent magnetization-thickness product ($Mr_1 t_1$) and the lowest cell has a remanent magnetization-thickness product ($Mr_2 t_2$) and wherein ($Mr_1 t_1$)/($Mr_2 t_2$) is equal to or greater than $2 * \exp(-2\pi * t_1/L)$, where L is the island pitch in the along-the-track direction.

9. A thermally-assisted recording (TAR) patterned-media magnetic recording disk drive comprising:
   a rotatable magnetic recording disk having a generally planar surface supporting a plurality of concentric data tracks, each data track patterned into discrete data islands separated by nonmagnetic spaces, each island comprising two stacked cells of magnetic material magnetizable generally perpendicular to the disk surface and separated by a nonmagnetic spacer, the upper cell in the stack having a Curie temperature $T_{C1}$ and the lower cell in the stack having a Curie temperature $T_{C2}$ greater than $T_{C1}$;

a disk drive data controller for controlling the data to be written to the data islands;

a write head for applying to the data islands a magnetic write field insufficient to magnetize the cells when the cells are at a temperature substantially below their Curie temperatures;

a laser coupled to the data controller and responsive to the data to be written to the data islands for supplying two levels of laser output power, a first laser power P1 for data corresponding to the magnetizations in the two cells of an island being antiparallel and a second level of laser power P2 greater than P1 for data corresponding to the magnetizations in the two cells of an island being parallel;

an optical channel and near-field transducer for directing radiation from the laser to the disk to heat the data islands; wherein laser power P1 heats the upper cell in an island to a temperature near $T_{C1}$ but less than $T_{C2}$ and laser power P2 heats the lower and upper cells in an island to a temperature greater than $T_{C1}$ and near $T_{C2}$; and a carrier for supporting the write head and near-field transducer, the carrier having a disk-facing surface maintained at a distance less than the wavelength of the laser light from the disk.

10. The disk drive of claim 9 wherein each cell comprises a FeXPt alloy, wherein X is selected from Cu and Ni.

11. The disk drive of claim 9 wherein the lower cell in a stack comprises the chemically-ordered binary alloy FePt.

12. The disk drive of claim 9 wherein the lower cell in a stack comprises a FeCuPt alloy wherein the amount of Cu is greater than or equal to 1 atomic and less than or equal to 20 atomic percent and the upper cell in a stack comprises a FeCuPt alloy wherein the amount of Cu present is greater than the amount of Cu present in the lower cell.

13. The disk drive of claim 9 wherein the difference between $T_{C2}$ and $T_{C1}$ is at least 100 K.

14. The disk drive of claim 9 further comprising a read head on the carrier for detecting a readback signal from the data islands, wherein the signal from the upper cell in an island is at least twice that of the signal from the lower cell in an island.

* * * * *